United States Patent [19]
Konishi

[11] 4,195,706
[45] Apr. 1, 1980

[54] POWER STEERING VALVE SYSTEM
[75] Inventor: Hideo Konishi, Yorii, Japan
[73] Assignee: Jidoshakiki Co., Ltd., Tokyo, Japan
[21] Appl. No.: 894,085
[22] Filed: Apr. 6, 1978
[30] Foreign Application Priority Data Apr. 11, 1977 [JP] Japan .................................. 52/41199
Sep. 30, 1977 [JP] Japan .................................. 52/117644

[51] Int. Cl.$^2$ ............................................. B62D 5/08
[52] U.S. Cl. ................................. 180/132; 91/375 A; 91/381
[58] Field of Search ............... 180/132, 148, 146, 147; 91/368, 381, 380, 385, 375 A

[56] References Cited
U.S. PATENT DOCUMENTS

| | | | |
|---|---|---|---|
| 2,931,239 | 4/1960 | Dietrich | 180/132 X |
| 2,964,017 | 12/1960 | Hruska | 91/368 |
| 3,791,475 | 2/1974 | Cadiou | 180/148 |

Primary Examiner—John A. Pekar
Attorney, Agent, or Firm—Blanchard, Flynn, Thiel, Boutell & Tanis

[57] ABSTRACT

A power steering valve system includes an input shaft and an output shaft which are aligned on a common axis, and also includes a control valve mechanism which is located offset from the axis in order to reduce the overall length of the valve system. The control valve mechanism includes a spool valve, a displacement of which from its neutral position controls the flow of a hydraulic oil from an oil pump to or from a power cylinder to assist in directing the steerable road wheels in a given direction. The input and output shafts are operatively associated with a motion translating mechanism which translates the magnitude of a relative torsion between the two shafts into a linear displacement. The motion translating mechanism is operatively associated with the spool valve to displace it from the neutral position in accordance with the magnitude of relative torsion between the two shafts.

9 Claims, 8 Drawing Figures

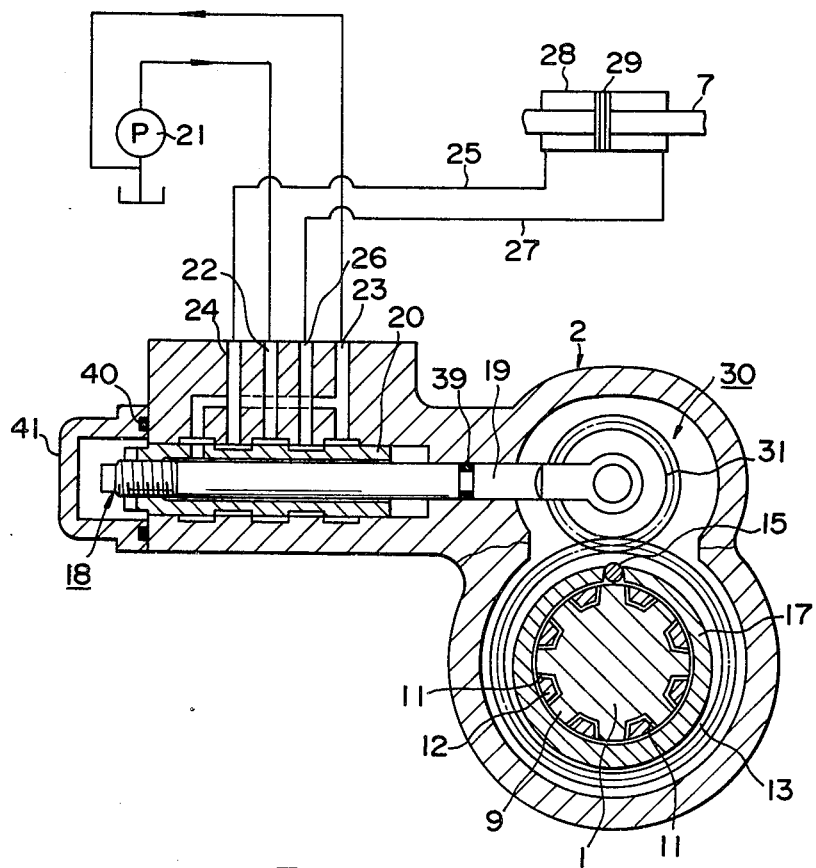
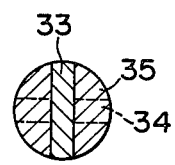

POWER STEERING VALVE SYSTEM

BACKGROUND OF THE INVENTION

The invention relates to a power steering system, and more particularly to such system which is preferred for use on vehicles of smaller sizes.

A power steering system generally includes an input shaft which is operatively connected with a steering wheel, an output shaft aligned with the input shaft on a common axis and which is operatively connected with steerable road wheels, and a control valve mechanism which controls the flow of hydraulic oil from an oil pump to or from a power cylinder by switching a hydraulic circuit. In the conventional power steering system, the control valve mechanism had to be disposed in alignment with the axis of the steering wheel, which resulted in increasing the overall length of the power steering system as compared with a manual steering gear unit. However, with the recent trend toward the use of the power steering system on small size vehicles, difficulties have been presented by the limited space, particularly in the axial direction, which prevented the conventional power steering valve system of having an increased overall length from being directly mounted on such vehicles.

SUMMARY OF THE INVENTION

In view of the foregoing, it is an object of the invention to provide a power steering system in which the control valve mechanism is located offset from the axis of the steering wheel so that the overall length can be reduced to a value comparable to that of the manual steering gear unit, thus permitting it to be mounted on small size vehicles in a relatively simple manner.

It is another object of the invention to minimize the radial offset of the control valve mechanism from the axis of the steering wheel to minimize the vertical height as well as the overall length of the power steering valve system, thus further facilitating the mounting of it on small size vehicles.

BRIEF DESCRIPTION OF THE DRAWINGS

FIG. 2 is a cross section taken along the line II—II shown in FIG. 1 together with a schematic diagram of a hydraulic circuit;

FIG. 3 is a cross section taken along the line III—III shown in FIG. 1;

DESCRIPTION OF EMBODIMENTS

Figure 1:
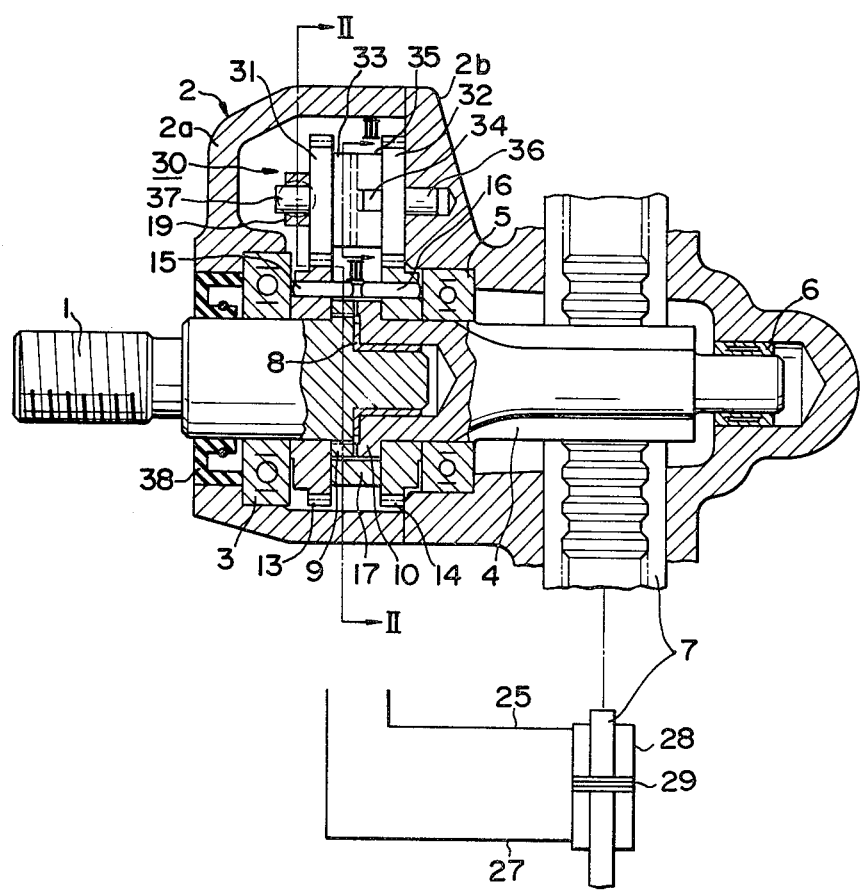
FIG. 1 is a transverse section, taken along a horizontal plane, of one embodiment of the invention.

Referring to FIG. 1, the power steering valve system of the invention includes an input shaft 1 which is rotatably mounted in a housing 2 by means of a bearing 3 and which is operatively connected with a steering wheel, not shown. The housing comprises a front and a rear housing portion 2a, 2b. An output shaft 4 is rotatably mounted in the housing 2 by means of bearings 5, 6, and is formed with a pinion which is in meshing engagement with a rack bar 7 for causing a sliding movement of the rack bar in a direction perpendicular to the axis of the output shaft 4. The opposite ends of the rack bar are operatively connected with steerable road wheels, not shown.

The input shaft 1 and output shaft 4 are disposed in axial alignment, and are disposed for rotation relative to each other by fitting an axial extension of the input shaft 1 into an axial bore formed in the adjacent end of the output shaft 4, with a bushing 8 capable of receiving a thrust and a radial force interposed therebetween. The opposing ends of the input shaft 1 and the output shaft 4 are formed with flanges 9, 10, respectively. As will be noted from FIG. 2, the flange 9 on the input shaft 1 is formed with a plurality of grooves 11 which are spaced apart a given interval around the circumference thereof and into which are fitted a plurality of projections 12 axially extending from the end face of the flange 10 and which are disposed at a given spacing around the circumference thereof. It is to be noted that there is a circumferential clearance of a given magnitude between each of the projections 12 and the respective grooves 11 so that a relative rotation between the shafts 1, 4 can take place as permitted by the clearance. A pair of identical external gears 13, 14 are fixedly mounted on the opposing ends of the input shaft 1 and the output shaft 4, respectively, with pins 15, 16 being press fit into the respective gears at positions in which they are in axial alignment with each other. An annular spring 17 is disposed around both the flanges 9, 10 and has its opposite ends abutting against the pins 15, 16 (see FIGS. 1, 2) to maintain them in axial alignment normally so that the projections 12 on the output shaft 4 are located centrally within the grooves 11 formed in the flange 9 of the input shaft 1. It will thus be seen that the input shaft 1 can be rotated relative to the output shaft 4 by an amount corresponding to the clearance between the projections 12 and the grooves 11 against the resilience of the spring 17. However, when an external force applied to the shafts is removed, the spring 17 returns both the shafts to their original position in which the angle of their relative rotation is null.

Referring to FIG. 2, there is shown a control valve mechanism 18 of a conventional arrangement. The mechanism comprises a rod 19 which is slidably supported within the housing 2, and a spool valve 20 mounted on the rod. An oil pump is schematically shown at 21, and hydraulic oil from the pump 21 can be fed to a power cylinder 28 through a path including ports 22, 24 formed in the housing 2 and through passage 25 while simultaneously draining the oil from the power cylinder through a path including passage 27 and ports 26, 23 also formed in the housing 2 in response to a lateral movement of the rod 19 and spool valve 20. Alternatively the oil can be fed through a path including elements 22, 26, 27 while simultaneously draining the oil from the cylinder through a path including elements 25, 24, 23. The power cylinder 28 is associated with a piston 29 which is fixedly connected with the rack bar 7, whereby a displacement of the spool valve is effective to assist in steering the steerable road wheels of the vehicle.

A motion translating mechanism 30, serving the same function as a conventional power steering system, is disposed intermediate the control valve mechanism 18 on one hand and the input and output shafts 1, 4 (FIG. 1) on the other hand for translating a relative angular displacement between the shafts 1, 4 into a linear displacement which is transmitted to the spool valve 20 of the control valve mechanism 18. In the example shown, the mechanism 30 comprises an Oldham's coupling which is known in itself. Referring back to FIG. 1, the Oldham's coupling comprises a pair of identical external gears 31, 32 which mesh with the external gears 13, 14, respectively. The gear 31 carries a projection 33 of a rectangular cross section on its end face and the gear 32 also carries a projection 34 of a rectangular cross section on its end face but which is disposed at right angles to the projection 33. A disc 35 is interposed between the opposing projections 33, 34. In its opposite end faces, the disc 35 is formed with grooves which are formed at right angles to each other in which the projections 33, 34 are fitted in a slidable manner. The gear 32 is mounted on a rotating shaft 36 which is rotatably mounted on the housing 2. The gear 31 is mounted on a rotating shaft 37 which is connected with the rod 19, which also serves as a bearing for the shaft 37. In FIG. 1, it will be noted that a seal 38 is provided to prevent leakage of lubricant grease from between the input shaft 1 and housing 2. Similarly, seals 39, 40 (FIG. 2) are provided to prevent leakage from the spool valve 20. At its end remote from the mechanism 30, the housing is closed by an end cover 41.

In the above arrangement, when the vehicle is running straightforward, namely, when the input shaft and output shaft are both stationary and a relative rotation therebetween is null, the gears 31, 32 of the translating mechanism 30 which mesh with the gears 13, 14 on the respective shafts 1, 4 also remain stationary, whereby the rotating shafts 36, 37 are aligned with each other. The spool valve 20 which is connected with the shaft 37 through the rod 19 is maintained in its neutral position. As a consequence, there is no supply of hydraulic oil from the pump 21 into the power cylinder 28, allowing the vehicle to continue its running forward.

When a steering wheel, not shown, is operated to rotate the input shaft 1, the latter will rotate relative to the output shaft 4 against the resilience of the spring 17 since the output shaft 4 is connected with the steerable road wheels through the rack bar 7 and thus is subject to the road resistance which the road vehicle undergoes. As a consequence, the external gear 31 which meshes the external gear 13 on the input shaft 1 tends to rotate as the input shaft 1 rotates, but is prevented from rotation since the other external gear 32 which is connected for integral rotation therewith through the Oldham's coupling meshes with the external gear 10 on the output shaft 4 which then remains stationary. This results in a displacement of the gears 31, 32 out of their axial alignment so as to have their axes offset from each other even though they remain parallel to each other. Since the external gear 32 is rotatably mounted in the housing 2 at a fixed position so that it is only capable of rotation, the other gear 31 has to be displaced lengthwise of the rod 19.

When the gear 31 is displaced from its normal, stationary position, the spool valve 20 is also displaced from its neutral position, switching a hydraulic circuit in a manner known in the art to supply a hydraulic oil to the power cylinder 28, thus assisting in steering the steerable road wheels. When the steerable road wheels begin to be steered, the output shaft 4 which is connected therewith through the rack bar 7 begins to rotate in the same direction as the input shaft 1.

When the input shaft and the output shaft rotate at an equal speed, the gears 31, 32 which form the Oldham's coupling will rotate in the same direction with the same speed. However, since the output shaft 4 continues to undergo a steering resistance from the road during the time the vehicle is turning, it rotates with the same speed as the input shaft while maintaining an angular displacement relative to the input shaft 1. Consequently, the gear 31 and its connected spool valve 20 are maintained in their displaced position, continuing to supply the hydraulic oil to the power cylinder 28. During such time interval, the driver of the vehicle will feel the resilience of the spring 17, which tends to reduce the relative angular displacement between the input and output shafts to null, as a reaction. When the force applied to the steering wheel is reduced to zero, the spring 17 reduces the relative angular displacement between the shafts to null, thus assuring that the gear 31 and the valve spool 20 will be returned to their neutral positions.

The gear 31 may be disengaged from meshing engagement with the gear 13 if it is allowed to move through an increased stroke lengthwise of the rod 19. However, the required displacement for the spool valve 20 which is connected with the gear 31 is generally small, and the movement of the gear 31, or the relative angular displacement between the shafts 1 and 4 can be accordingly adjusted in accordance with the magnitude of the clearance between the grooves 11 and projections 12, so that the disengagement of the gear 31 from the gear 13 can be avoided. If it becomes necessary to achieve a greater displacement of the spool valve 20, the rod 19 may be connected with a link which permits the gear 31 to turn around the gear 13 while maintaining its meshing engagement with the latter.

Figure 4:
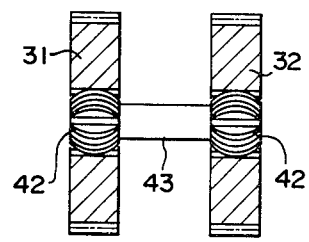
FIGS. 4 and 5 are a cross section and a plan view of the linkage of a motion translating mechanism which is different from that shown in previous Figures.
Figure 5:
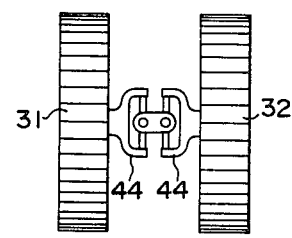

While in the embodiment described above, mechanism 30 which translates the relative angular displacement between the input and output shafts into a linear displacement comprises an Oldham's coupling, any other similar arrangement may be used which is capable of transmitting rotation between two parallel shafts. FIGS. 4 and 5 show such alternative arrangements. In FIG. 4, the gears 31, 32 are formed with splines, which are engaged by mating splines formed on the opposite spherical ends 42 of a rotating shaft 43, which thus connect both the gears together. In FIG. 5, both the gears 31, 32 are coupled together by a pair of hook-shaped universal joints 44, with splines to accommodate for a change in the spacing between the joints 44.

Figure 8:
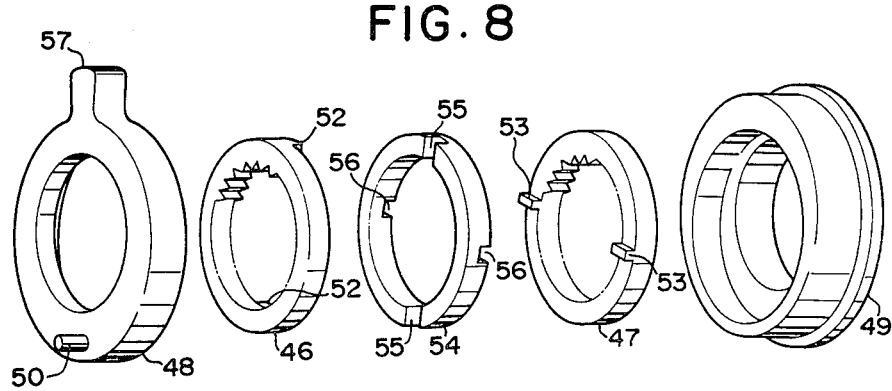
FIG. 8 is an exploded, fragmentary perspective view of parts shown in FIGS. 6 and 7.
Figure 6:
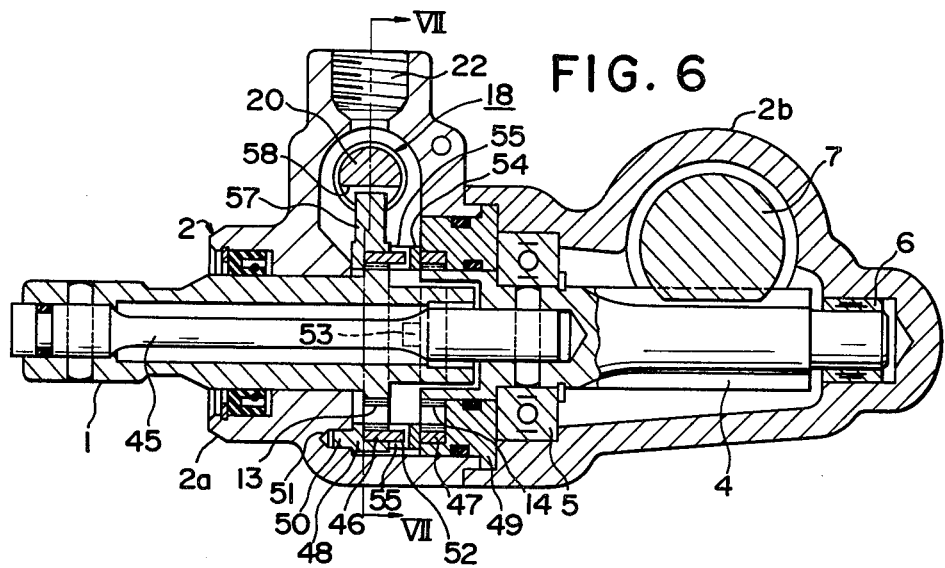
FIG. 6 is a longitudinal section of another embodiment of the invention.
Figure 7:
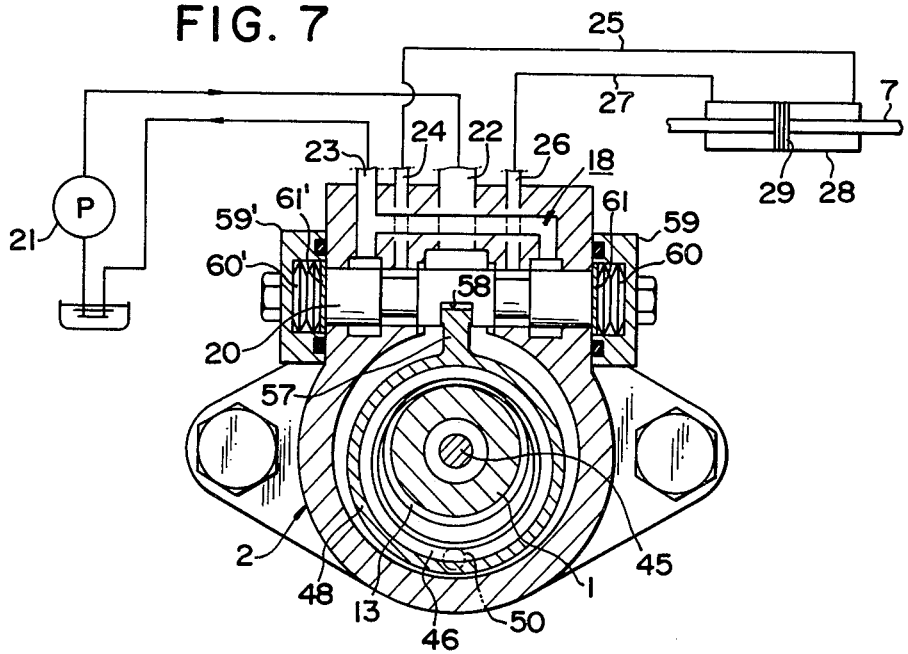
FIG. 7 is a cross section taken along the line VII—VII shown in FIG. 6 together with a schematic diagram of the hydraulic circuit.

FIGS. 6 to 8 show another embodiment of the invention. In this embodiment, the input shaft 1 and the output shaft 4 are connected together by a torsion bar 45, the twisting of which permits a rotation of the shafts 1, 4 relative to each other.

Adjacent to their opposing ends, the shafts 1, 4 are integrally formed with identical external gears 13, 14 as before, which mesh with identical internal gears 46, 47, respectively. These internal gears 46, 47 are rotatably mounted in annular bearing members 48, 49, respectively. The bearing member 49 is fixedly mounted within the housing 2 while the other bearing member 48 has a pin 50 axially extending from its end face and which engages a bore 51 formed in the housing 2, thus permitting the bearing member 48 to oscillate about the pin 50. As shown in FIG. 8, on their end faces which oppose each other, the internal gears 46, 47 are provided with a pair of projections 52, 53, respectively, which are diametrically opposite to each other. A ring 54 is interposed between the gears 46, 47, and is formed with pairs of diametrically opposite grooves 55, 56 in their end faces, respectively, which are engageable with the projections 52, 53, respectively. As shown, the diameters which join the respective pairs of grooves 55, 56 are at right angles to each other. These internal gears 46, 47 and ring 54 are connected together by the mating engagement between the projections 52, 53 and the grooves 55, 56 as shown in FIG. 6, thus constituting an Oldham's coupling which connects the internal gears 46, 47 in the similar manner as before. When a relative rotation occurs between the input and output shafts 1, 4, the resulting relative angular displacement therebetween will cause the bearing member 48 to oscillate about the pin 50.

In order to transmit the oscillation of the bearing member 48 to the spool valve 20 of the control valve mechanism 18 as a linear movement, the bearing member 48 is peripherally provided with an outwardly extending tab 57 which is located diametrically opposite from the pin 50 and which is engaged with a groove 58 formed centrally in the spool valve 20. The axial length of the spool valve 20 is chosen commensurate with the lateral width of the housing 2, and a pair of end covers 59, 59' which are secured to the housing 2 so as to cover the opposite ends of the spool valve 20 internally contain Belleville springs 60, 60', respectively. These springs urge discs 61, 61' into abutment against the opposite sides of the housing 2 and the end faces of the spool valve 20 simultaneously in the neutral position of the spool valve 20, so that the spool valve 20 is positively maintained in its neutral position for any back lash or tolerances between the external gears 13, 14 and the internal gears 46, 47 or between the projections 52, 53 on the internal gears and the grooves 55, 56 formed in the ring 54.

When a steering wheel is manually operated to rotate the input shaft, the latter will rotate relative to the output shaft 4 against the resilience of the torsion bar 45 since the output shaft 4 is connected with the steerable road wheels through the rack bar 7 and hence is subject to the road resistance. As the input shaft 1 rotates, the internal gear 46 which meshes with it tends to rotate, but is prevented from rotating since the other internal gear 47 which is connected for integral rotation with the internal gear 46 through the Oldham's coupling remains in meshing engagement with the external gear 14 on the output shaft 4 which is still at rest. As a consequence, the bearing member 48 which supports the internal gear 46 will oscillate in one direction about the pin 50 for the reasons mentioned before, causing a displacement of the spool valve 20 in one direction from its neutral position through the engagement between the tab 57 and the groove 58.

Thus it will be seen that this embodiment performs the similar functioning as the previous embodiment. In addition, the use of the internal gears 46, 47 in the present embodiment enables the lateral size of the control valve mechanism 18, as measured radially from the axis of the steering wheel, to be minimized. The driver of the vehicle will feel the twisting force of the torsion bar 45, which tends to reduce the relative angular displacement between the shafts 1, 4 to null, as a reaction. Instead of deriving a displacement of the internal gear 46 as an oscillation of its supporting bearing member 48, the bearing member 48 may be disposed for sliding movement in a direction perpendicular to the axis of the shafts 1, 4 in order to derive a displacement of the internal gear 46 as a linear movement of the bearing member 48.

What is claimed is:

1. A power steering apparatus for a vehicle having a steering wheel, steerable road wheels and a power cylinder for assisting steering movement of said steerable road wheels, comprising:
    a rotatable input shaft adapted to be operatively connected to said steering wheel;
    a rotatable output shaft adapted to be operatively connected to said steerable road wheels, said input shaft and said output shaft being rotatable about a common first axis;
    motion-transmitting means connecting said input shaft and said output shaft so that said output shaft can be rotated by said input shaft, said motion-transmitting means including means permitting limited, relative, angular displacement between said shafts about said first axis;
    a valve for controlling operation of said power cylinder, said valve having a movable valve element;
    a pair of external gears respectively affixed to said input shaft and said output shaft for rotation therewith;
    a pair of further gears respectively meshed with said external gears for rotation therewith;
    support means rotatably supporting one of said further gears for rotation about a second fixed axis;
    a bearing member rotatably supporting the other of said further gears, said bearing member being mounted for lateral movement relative to said second axis and being connected to said movable valve element for effecting movement thereof;
    linkage means interconnecting said pair of further gears for conjoint rotation, said linkage means including means permitting radial displacement of said other further gear relative to said one further gear in response to limited relative angular displacement between said input and output shafts and corresponding limited relative angular displacement between said external gears so that said radial displacement of said other further gear also displaces said bearing member and thereby said movable valve element, whereby said valve supplies pressure fluid to said power cylinder to assist steering of said steerable road wheels.

2. A power steering apparatus according to claim 1 wherein said valve is an elongated spool valve the longitudinal axis of which is substantially perpendicular to said first and second axes.

3. A power steering apparatus according to claim 1 or claim 2 in which said further gears have external gear teeth, said second axis being parallel with and laterally offset from said first axis, said linkage means comprising a member disposed between said pair of further gears and having first and second guide means respectively interconnected with said further gears so that said further gears can slide relative to each other in directions which are mutually perpendicular to each other and are perpendicular to said second axis.

4. A power steering apparatus according to claim 1 or claim 2 in which said further gears have external gear teeth, said second axis being parallel with and laterally offset from said first axis, said linkage means comprising a splined axial bore located on the axis of each of said further external gears and a rotatable shaft having splined spherical ends meshed with the splines of said axial bores.

5. A power steering apparatus according to claim 1 or claim 2 in which said further gears have external gear teeth, said second axis being parallel with and laterally offset from said first axis, said linkage means comprising a pair of universal joints connected between said further gears.

6. A power steering apparatus according to claim 1 or claim 2 in which said further gears have internal gear teeth, said second axis being coaxial with said first axis, said linkage means comprising an annular member disposed between said pair of further gears and having first and second guide means respectively interconnected with said further gears so that said further gears can slide relative to each other in directions which are mutually perpendicular to each other and are perpendicular to said second axis.

7. A power steering apparatus according to claim 1 or claim 2 in which said motion-transmitting means comprises interfitting axially extending grooves and projections on said input shaft and said output shaft, said grooves being of greater width than said projections to provide circumferential clearance therebetween to permit relative angular displacement between said input and output shafts, and a spring for resiliently urging said projections toward circumferentially centered positions in said grooves.

8. A power steering apparatus according to claim 1 or claim 2 in which said motion-transmitting means comprises a torsion bar connected to and extending between said input shaft and said output shaft.

9. A power steering apparatus according to claim 1 or claim 2 wherein said output shaft has a pinion thereon, and including a rack bar meshed with said pinion, said rack bar being adapted to be drivingly connected to said steerable road wheels.

* * * * *